United States Patent
Kondo

(10) Patent No.: US 11,022,156 B2
(45) Date of Patent: Jun. 1, 2021

(54) ACTUATOR-OPERATION DETECTING APPARATUS

(71) Applicant: CKD CORPORATION, Komaki (JP)

(72) Inventor: Takemoto Kondo, Yokkaichi (JP)

(73) Assignee: CKD CORPORATION, Komaki (JP)

(*) Notice: Subject to any disclaimer, the term of this patent is extended or adjusted under 35 U.S.C. 154(b) by 0 days.

(21) Appl. No.: 16/527,935

(22) Filed: Jul. 31, 2019

(65) Prior Publication Data
US 2020/0072253 A1   Mar. 5, 2020

(30) Foreign Application Priority Data

Aug. 29, 2018 (JP) .............................. JP2018-159955

(51) Int. Cl.
| | |
|---|---|
| *G01M 13/00* | (2019.01) |
| *F15B 19/00* | (2006.01) |
| *F15B 11/10* | (2006.01) |
| *F15B 15/28* | (2006.01) |

(52) U.S. Cl.
CPC ............ *F15B 19/007* (2013.01); *F15B 11/10* (2013.01); *F15B 15/2838* (2013.01); *G01M 13/00* (2013.01)

(58) Field of Classification Search
CPC ....... G01M 13/00; F15B 19/007; F15B 11/10; F15B 15/2858
USPC ........................................................... 73/37
See application file for complete search history.

(56) References Cited

U.S. PATENT DOCUMENTS

2018/0094654 A1   4/2018 Fujiwara

FOREIGN PATENT DOCUMENTS

| EP | 3450774 A1 | 3/2019 |
|---|---|---|
| JP | 2017-033464 A | 2/2017 |
| JP | 2018-059549 A | 4/2018 |
| WO | 2017/187934 A1 | 11/2017 |

OTHER PUBLICATIONS

Jan. 6, 2021 Office Action issued in Japanese Patent Application No. 2018-159955.

*Primary Examiner* — John Fitzgerald
*Assistant Examiner* — Rodney T Frank
(74) *Attorney, Agent, or Firm* — Oliff PLC

(57) ABSTRACT

An actuator-operation detecting apparatus is configured to check the operating state of a piston of an actuator. The actuator includes a double-acting cylinder, the piston that partitions the cylinder into a first pressure acting chamber and a second pressure acting chamber, and a rod connected to an end face of the piston facing the second pressure acting chamber. The actuator-operation detecting apparatus includes a first pressure detector to detect the pressure in the first pressure acting chamber, a second pressure detector to detect the pressure in the second pressure acting chamber, a differential amplifier circuit to calculate a thrust force acting on the piston based on the pressures detected by the first and second pressure detectors and the pressure-receiving area of the piston, and a microcomputer to monitor the operation of the piston based on the thrust force.

5 Claims, 7 Drawing Sheets

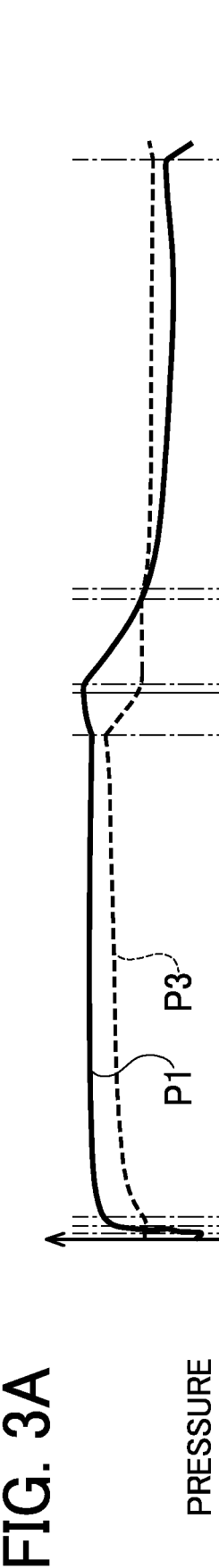
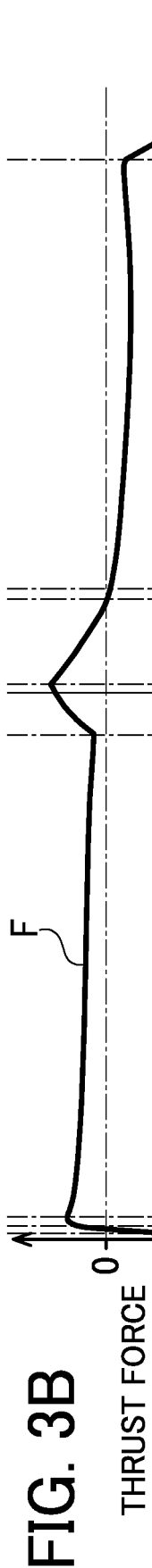
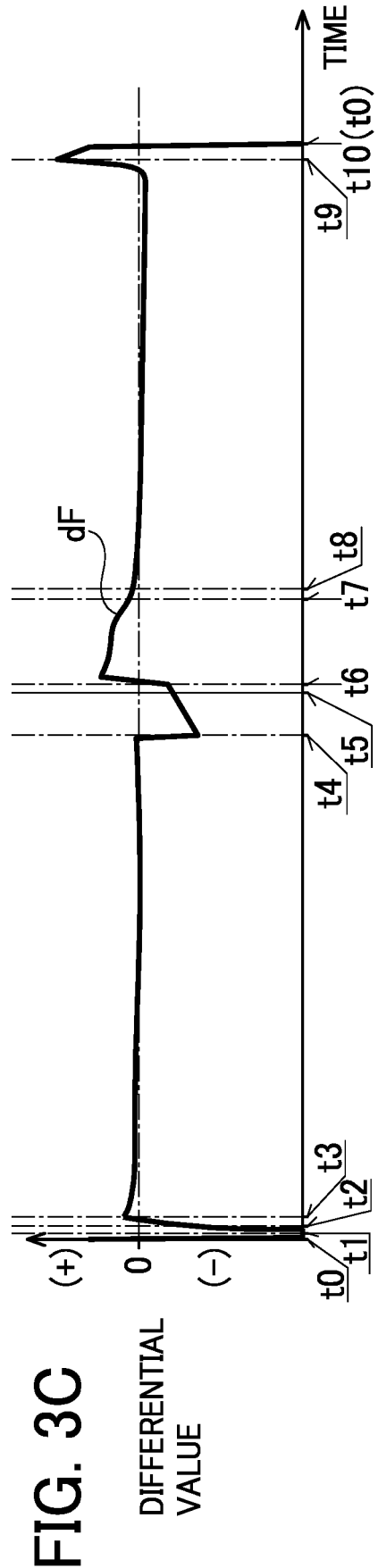
FIG. 3A
FIG. 3B
FIG. 3C

ACTUATOR-OPERATION DETECTING APPARATUS

CROSS-REFERENCE TO RELATED APPLICATIONS

This application is based upon and claims the benefit of priority from the prior Japanese Patent Application No. 2018-159955 filed on Aug. 29, 2018, the entire contents of which are incorporated herein by reference.

BACKGROUND

Technical Field

The present disclosure relates to an actuator-operation detecting apparatus for an actuator including a double-acting cylinder, a piston slidably supported in the double-acting cylinder to partition the inside of the double-acting cylinder into a first pressure acting chamber and a second pressure acting chamber, a rod coupled to an end face of the piston that faces the second pressure acting chamber, which is simply referred to as a second piston end face, and the actuator-operation detecting apparatus being configured to monitor an operating state of the piston.

Related Art

For control of robot arms to be used in food factories and others, generally, an actuator including a double-acting cylinder is used. The inside of the double-acting cylinder is partitioned by a piston into a first pressure acting chamber and a second pressure acting chamber. These pressure acting chambers are each connected to one end of a pipe for supplying or exhausting compressed air. The other end of each pipe is connected to a compression air supply source via a changeover valve. When a changeover valve is operated to switch between air supply to the first pressure acting chamber and air supply to the second pressure acting chamber to cause the piston to reciprocate inside the cylinder.

Herein, a rod is connected to an end face of the piston that faces the second pressure acting chamber. The forward movement of the piston is defined as moving toward an end face of the double-acting cylinder that faces the second pressure acting chamber, which is simply referred to as a second cylinder end face, so that the rod protrudes out of the double-acting cylinder. The backward movement of the piston is defined as moving toward an end face of the double-acting cylinder that faces the first pressure acting chamber, which is simply referred to as a first cylinder end face, so that the rod is retracted into the double-acting cylinder.

In the foregoing double-acting cylinder, the rod contains a built-in magnet and further magnetism detecting sensors are placed at one end and the other end of a main body of the double-acting cylinder to detect whether the piston has reached the first cylinder end face or the second cylinder end face of the double-acting cylinder body in order to monitor the reciprocating movement of the piston.

In the food factories, however, cleaning liquids used for cleaning foods and others may be splashed on the double-acting cylinder body. Such splashing of the cleaning liquid may cause corrosion of the magnetism detecting sensors or wires for these sensors.

Therefore, as disclosed in WO2017/187934, there is used an actuator-operation detecting apparatus configured to detect a first pressure value of a fluid in a pipe connected to the first pressure acting chamber and a second pressure value of a fluid in a pipe connected to the second pressure acting chamber, and determine whether a differential pressure between the first pressure value and the second pressure value is a positive value or a negative value to monitor whether the piston has reached the first cylinder end face or the second cylinder end face of the double-acting cylinder body.

Specifically, during forward movement of the piston, the first pressure value is higher than the second pressure value. During backward movement of the piston, on the other hand, the second pressure value is higher than the first pressure value. Thus, the differential pressure obtained by subtracting the second pressure value from the first pressure value is a positive value during the piston forward movement and alternatively a negative value during the piston backward movement. Accordingly, it is determined that the piston is moving forward if the differential pressure is a positive value and the piston is moving backward if the differential pressure is a negative value. When the piston has reached one end of the double-acting cylinder and finished the forward movement or backward movement, the differential pressure sharply varies. By capturing such a sharp variation in differential pressure, the apparatus can determine that the piston has reached one end of the double-acting cylinder.

Thus, determining whether the differential pressure is a positive value or a negative value before the differential pressure sharply varies enables determination of which end of the double-acting cylinder the piston has reached.

If the double-acting cylinder is small in size, the first pressure acting chamber and the second pressure acting chamber each have a small volume, the first pressure value and the second pressure value may only vary slightly when the piston is switched between a push operation and a pull operation. This configuration may cause false detection due to noise. Therefore, as disclosed in JP 2018-59549A, there is used an actuator-operation detecting apparatus configured to monitor a change rate of a pressure value by time-differentiating the pressure value, and monitor whether the piston has reached the first cylinder end face or the second cylinder end face of the double-acting cylinder.

According to the aforementioned actuator-operation detecting apparatuses, any magnetism detecting sensors or wires for these sensors do not need to be disposed near the double-acting cylinder. Thus, the magnetism detecting sensors or their wires are less likely to corrode due to the cleaning liquids used in food factories.

SUMMARY

Technical Problems

However, the aforementioned conventional arts may cause for example the following problems.

A first problem is described below. For the actuator-operation detecting apparatus to monitor the piston operation based on the pressure values disclosed in WO2017/187934, the present applicant has found that, if an operating takt (i.e., an operating cycle or interval) is set slow by a speed controller, the piston operation cannot be accurately monitored.

For instance, for 1 sec of a switching cycle of the changeover valve, if the exhaust amount of air is limited by the speed controller to delay the piston operating takt to 900 msec, when an electrical signal is applied (time t0) to a solenoid of the changeover valve, as shown in FIG. 5, the changeover valve is switched (time t1) to start air supply to the first pressure acting chamber, causing a first pressure value P1 to start to rise, and also start air exhaust from the second pressure acting chamber, causing a second pressure value P2 to start to decrease. However, the first pressure value P1 and the second pressure value P2 do not become reverse to each other in magnitude, so that the piston starts moving forward (time t3) even while the second pressure value P2 remains higher than the first pressure value P1.

The reason for why the piston starts the forward movement while the second pressure value P2 remains higher than the first pressure value P1 is conceived as follows. If the air exhaust amount is limited by the speed controller, the second pressure value P2 in the second pressure acting chamber on the air exhaust side is maintained higher than that in the case where the air exhaust amount is not limited. However, the second piston end face of the piston is smaller in pressure-receiving area than the other end face of the piston (a first piston end face) because of the rod connected to the second piston end face. Thus, even if the second pressure value P2 is higher than the first pressure value P1, the force acting on the second piston end face (that is, a second acting force F2) is lower than the force acting on the first piston end face of the piston (that is, a first acting force F1), thus enabling the forward movement.

After completion of the forward movement of the piston (time t4), the first pressure value P1 rises and the second pressure value P2 decreases. Immediately after that, an electric signal is applied to the solenoid of the changeover valve (time t5) to switch the state of the changeover valve to start air supply to the second pressure acting chamber and air exhaust from the first pressure acting chamber (time t6). Thus, the second pressure value P2 stops decreasing and the first pressure value P1 starts to decrease. This allows the piston to start the backward movement without reversing the first pressure value P1 and the second pressure value P2 to each other in magnitude.

Throughout the forward movement and backward movement of the piston, the first pressure value P1 and the second pressure value P2 do not become reverse to each other in magnitude, so that the first pressure value P1 is constantly lower than the second pressure value P2. Thus, a differential pressure is always obtained as a negative value by subtracting the second pressure value P2 from the first pressure value P1. It is therefore impossible to determine whether the piston is moving forward or moving backward based on the sign of the differential pressure. Consequently, the operation of the piston could not be accurately monitored.

Under the aforementioned circumstances, the present applicant noticed that the thrust force acting on an object is involved in the motion of the object and also there is a limit to monitor the piston operation based on the pressure values. The present applicant thus has reached a conclusion that it is desirable to monitor the piston operation based on the thrust force acting on the piston. The acting forces applied to the piston exhibit a relationship such that if the piston is moving forward, the first acting force F1 on the piston is larger than the second acting force F2 and in contrast, if the piston is moving backward, the second acting force F2 of the piston is larger than the first acting force F1. This relationship is not changed by the operating takt and can obviously determine whether the thrust force acts in a forward direction of the piston or acts in a backward direction.

A second problem is described below. In the actuator-operation detecting apparatus disclosed in JP 2018-59549A, a microcomputer built into this actuator-operation detecting apparatus may cause a delay in information processing.

For instance, when the actuator-operation detecting apparatus is configured to monitor the change rate of the pressure value by time-differentiating the first pressure value P1 and the second pressure value P2 and to monitor whether the piston has reached the first cylinder end face or the second cylinder end face of the double-acting cylinder body, that is, to monitor which the piston has reached, the first cylinder end face or the second cylinder end face, as shown in FIG. 6, a time differential value dP1 of the first pressure value P1 in the first pressure acting chamber greatly varies in a positive direction (from a negative side toward a positive side) just before the start of piston operation (time t3), but slightly varies at the time of operation stop (time t4). This configuration makes it easy to detect the operation start time but may cause false detection of the operation stop time due to noise. Moreover, as shown in FIG. 7, a time differential value dP2 of the second pressure value P2 in the second pressure acting chamber slightly varies just before the start of piston operation (time t3), but greatly varies just before the stop of piston operation (time t4). This configuration makes it easy to detect the operation stop time but may cause false detection of the operation start time due to noise.

To prevent the false detection due to noise and reliably detect the operation start time and the operation stop time, both the change rate of the first pressure value P1 and the change rate of the second pressure value P2 have to be monitored by for example detecting the change rate of the first pressure value P1 at the operation start time and detecting the change rate of the second pressure value P2 at the operation stop time. Thus, the microcomputer built into the actuator-operation detecting apparatus may cause a delay in information processing.

The present disclosure has been made to address the above problems 1 and 2 and has a purpose to provide an actuator-operation detecting apparatus capable of accurately monitoring the operation of a piston irrespective of the speed of an operating takt and preventing a delay in information processing.

Means of Solving the Problems (1) To achieve the above-mentioned purpose, one aspect of the present disclosure provides an actuator-operation detecting apparatus for an actuator, the actuator including: a double-acting cylinder; a piston slidably supported in the double-acting cylinder to partition an inside of the double-acting cylinder into a first pressure acting chamber and a second pressure acting chamber; and a rod coupled to an end face of the piston that faces the second pressure acting chamber, the actuator-operation detecting apparatus being configured to monitor an operating state of the piston, wherein the actuator-operation detecting apparatus comprises: a first pressure detector configured to detect pressure in the first pressure acting chamber; a second pressure detector configured to detect pressure in the second pressure acting chamber; a calculator configured to calculate a thrust force acting on the piston based on the pressure detected by the first pressure detector, the pressure detected by the second pressure detector, and a pressure-receiving area of the piston; and a monitor configured to check the operating state of the piston.

According to the above configuration (1), the first pressure detector and the second pressure detector respectively detect the pressure in the first pressure acting chamber and the pressure in the second pressure acting chamber. The calculator calculates the thrust force acting on the piston based on the pressure in the first pressure acting chamber, the pressure in the second pressure acting chamber, and the pressure-receiving area of the piston. Based on this calculated thrust force, the monitor can check the operating state of the piston. During piston forward movement, the first acting force of the piston is larger than the second acting force. During piston backward movement, the second acting force is larger than the first acting force. This relationship between the first and second acting forces does not change with the speed of the operating takt. Thus, the thrust force acting on the piston has only to be calculated to determine whether the piston is moving forward or moving backward. The operation detecting apparatus can therefore accurately monitor the operation of the piston irrespective of the speed of an operating takt.

BRIEF DESCRIPTION OF THE DRAWINGS

FIGS. 3A to 3C are time charts showing pressure, thrust force, and differential value; specifically, FIG. 3A is a graph showing behaviors of a first pressure value and a third pressure value varying with time, FIG. 3B is a graph showing behaviors of a thrust force acting on a piston varying with time, and FIG. 3C is a graph showing behaviors of a time differential value of the thrust force varying with time;

DETAILED DESCRIPTION OF THE EXEMPLARY EMBODIMENTS

A detailed description of an embodiment of an actuator-operation detecting apparatus which is one of the typical embodiments of this disclosure will now be given referring to the accompanying drawings.

Figure 1:
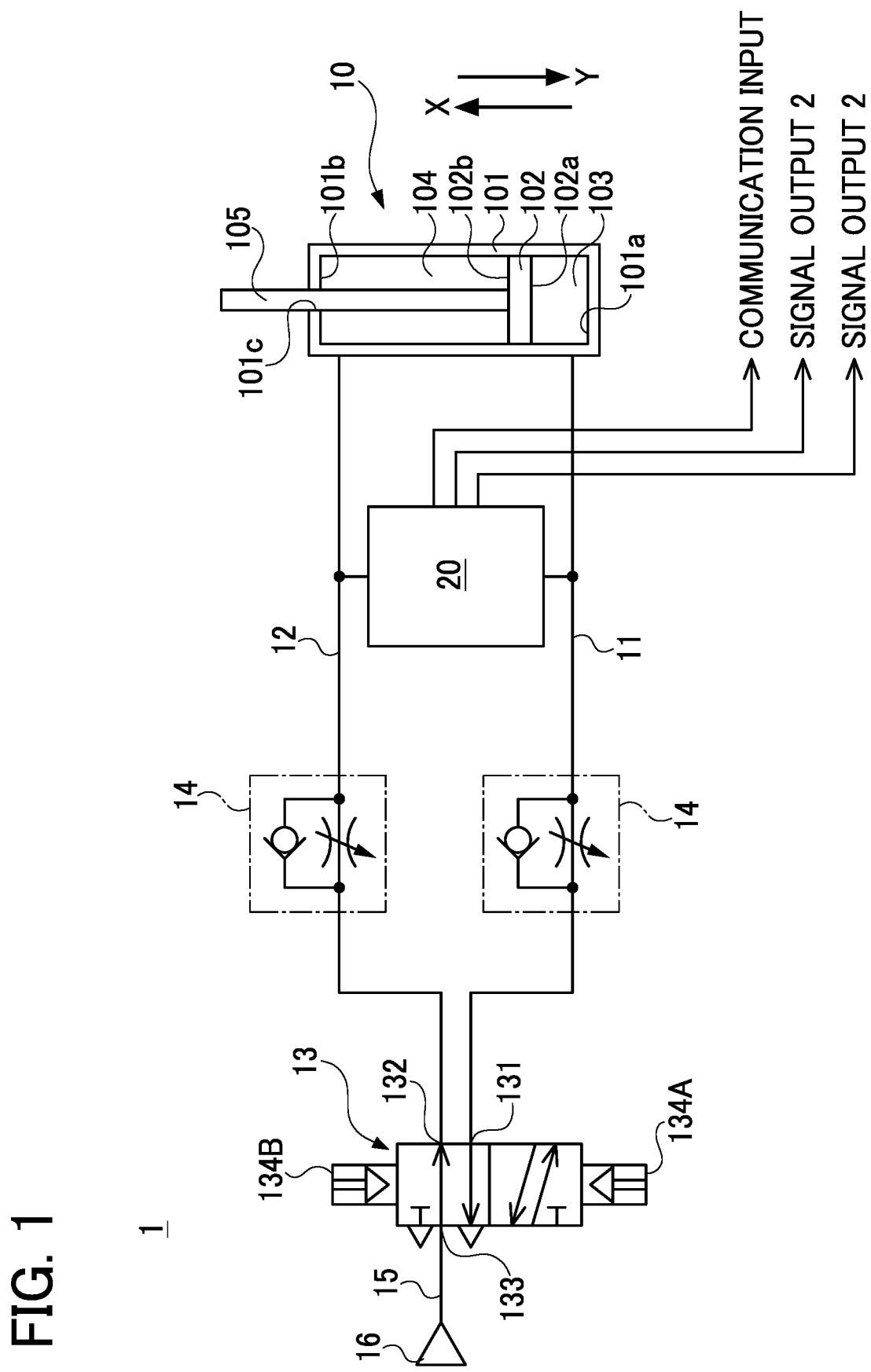
FIG. 1 is a circuit diagram of an actuator monitoring system using an actuator-operation detecting apparatus in an embodiment.

FIG. 1 is a circuit diagram of an actuator monitoring system using an actuator-operation detecting apparatus 20 (hereinafter, also referred to as an operation detecting apparatus 20) for an actuator 10. This actuator-operation detecting apparatus 20 functions as an apparatus for monitoring an operating state of a piston 102 slidably supported in a double-acting cylinder 101 of the actuator 10.

The inside of the double-acting cylinder (hereinafter, also simply referred to as a cylinder) 101 is partitioned by the piston 102 into a first pressure acting chamber 103 and a second pressure acting chamber 104. Furthermore, a rod 105 is coupled to an end face 102b of the piston 102, the end face 102b being located facing, or defining, the second pressure acting chamber 104 (hereinafter, also referred to as a second piston end face 102b). The rod 105 extends through an insertion hole 101c of an end face 101b of the double-acting cylinder 101, the end face 101b being located facing the second pressure acting chamber 104 (hereinafter, also referred to as a second cylinder end face 101b) and protruding out of the double-acting cylinder 101.

The first pressure acting chamber 103 has a port connected to one end of a first pipe 11 for supply or exhaust of compressed air. The other end of the first pipe 11 is connected to a first connection port 131 of a changeover valve 13.

The second pressure acting chamber 104 has a port connected to one end of a second pipe 12 for supply or exhaust of compressed air. The other end of the second pipe 12 is connected to a second connection port 132 of the changeover valve 13.

On each of the first pipe 11 and the second pipe 12, a speed controller 14 is provided.

The changeover valve 13 has an inlet port 133 to introduce compressed air into the valve 13. This inlet port 133 is connected to one end of an air supply pipe 15. The other end of this air supply pipe 15 is connected to a compressed air supply source 16.

In the present embodiment, the changeover valve 13 is a double-solenoid electromagnetic valve internally including a valve element (not shown) which is driven by an electric signal externally applied to solenoids 134A and 134B.

When an electric signal is applied to the solenoid 134A, the valve element of the changeover valve 13 is attracted toward the solenoid 134 to allow communication between the inlet port 133 and the first connection port 131 and allows the second connection port 132 to communicate with the outside, or atmosphere.

When the inlet port 133 communicates with the first connection port 131, the compressed air supplied from the compressed air supply source 16 flows in the changeover valve 13 through the inlet port 133 and flows out of the changeover valve 13 through the first connection port 131. The compressed air flowing out from the first connection port 131 then flows through the first pipe 11 and enters the first pressure acting chamber 103 of the double-acting cylinder 101.

When the compressed air is supplied to the first pressure acting chamber 103, the internal pressure in the first pressure acting chamber 103 rises, pushing an end face 102a of the piston 102, the end face 102a being located facing, or defining, the first pressure acting chamber 103 (hereinafter, also referred to as a first piston end face 102a) to move the piston 102 in a forward direction (along an arrow X in FIG. 1). When the piston 102 moves in the forward direction, air exhaust from the second pressure acting chamber 104 is started, allowing the compressed air having been supplied to the second pressure acting chamber 104 to be released to the outside through the second pipe 12, the second connection port 132, and the changeover valve 13.

On the other hand, when an electric signal is applied to the solenoid 134B, the valve element of the changeover valve 13 is attracted toward the solenoid 134B to allow communication between the inlet port 133 and the second connection port 132 and allow the first connection port 131 to communicate with the outside, or atmosphere.

When the inlet port 133 communicates with the second connection port 132, the compressed air supplied from the compressed air supply source 16 flows in the changeover valve 13 through the inlet port 133 and flows out of the changeover valve 13 through the second connection port 132. The compressed air flowing out from the second connection port 132 then flows through the second pipe 12 and enters the second pressure acting chamber 104 of the double-acting cylinder 101.

When the compressed air is supplied to the second pressure acting chamber 104, the internal pressure in the second pressure acting chamber 104 rises, pushing the second piston end face 102b of the piston 102 to move the piston 102 in a backward direction (along an arrow Y in FIG. 1). When the piston 102 moves in the backward direction, air exhaust from the first pressure acting chamber 103 is started, allowing the compressed air having been supplied to the first pressure acting chamber 103 to be released to the outside through the first pipe 11, the first connection port 131, and the changeover valve 13.

By selective energization of the solenoids 134A and the solenoid 134B of the changeover valve 13 to drive the valve element, the changeover valve 13 can switch between supply of compressed air to the first pressure acting chamber 103 and supply of compressed air to the second pressure acting chamber 104. By repeating this switching, the piston 102 is caused to move reciprocally back and forth. In association with the reciprocation of the piston 102, the rod 105 connected to the second piston end face 102b of the piston 102 is also moved back and forth.

The actuator-operation detecting apparatus 20 is placed on and connected to the first pipe 11 and the second pipe 12, between the speed controllers 14 and the actuator 10. This actuator-operation detecting apparatus 20 is configured to sequentially detect a first pressure value P1 in the first pipe 11 and a second pressure value P2 in the second pipe 12 and monitor the operation of the piston 102 in the actuator 10.

Figure 2:
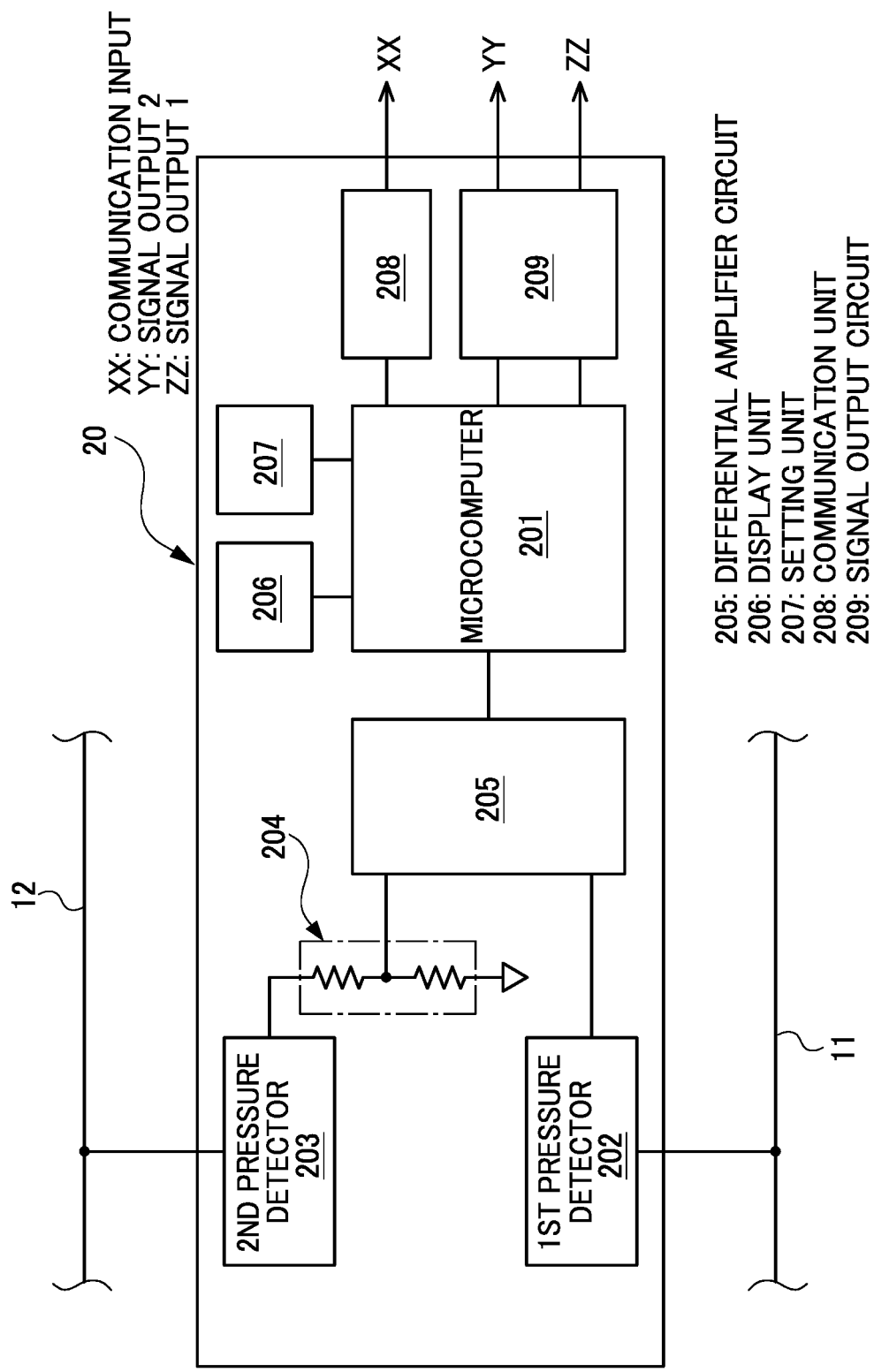
FIG. 2 is a block diagram showing the configuration of the actuator-operation detecting apparatus.

The configuration of the actuator-operation detecting apparatus 20 will be described below. FIG. 2 is a block diagram showing the configuration of the actuator-operation detecting apparatus 20.

This actuator-operation detecting apparatus 20 includes a microcomputer 201, a first pressure detector 202, a second pressure detector 203, a differential amplifier circuit 205, a display unit 206, a setting unit 207, a communication unit 208, and a signal output circuit 209.

The first pressure detector 202 is connected to the first pipe 11 to detect a first pressure value P1 representing the pressure of compressed air in the first pipe 11. The second pressure detector 203 is connected to the second pipe 12 to detect the second pressure value P2 representing the pressure of compressed air in the second pipe 12. The pressure in the first pipe 11 varies according to the internal pressure in the first pressure acting chamber 103 and the pressure in the second pipe 12 varies according to the internal pressure in the second pressure acting chamber 104. Thus, detecting the pressure values in the first pipe 11 and the second pipe 12 corresponds to detecting the pressure values in the first pressure acting chamber 103 and the second pressure acting chamber 104.

The first pressure detector 202 is connected to the differential amplifier circuit 205 to output a signal representing the first pressure value P1 detected by the first pressure detector 202 to the differential amplifier circuit 205.

The second pressure detector 203 is connected to the differential amplifier circuit 205 through a voltage divider 204 so that a signal representing the second pressure value P2 detected by the second pressure detector 203 is divided by the voltage divider 204 and then input to the differential amplifier circuit 205. In other words, the second piston end face 102b of the piston 102, to which the rod 105 is connected, has a pressure-receiving area smaller than a pressure-receiving area of the first piston end face 102a by an area corresponding to the outer diameter (i.e., the cross-sectional area) of the rod 105. The voltage divider 204 is configured to divide a signal representing the second pressure value P2 based on a ratio between the pressure-receiving area of the first piston end face 102a and the pressure-receiving area of the second piston end face 102b, and output the divided signal as a third pressure value P3.

For instance, assuming that the diameter of the piston 102 is 25 mm and the diameter of the rod 105 is 12 mm, the ratio of the pressure-receiving area of the second piston end face 102b of the piston 102 to the pressure-receiving area of the first piston end face 102a is about 0.75. Thus, the third pressure value P3 is obtained by multiplying the second pressure value P2 by 0.75.

The differential amplifier circuit 205 is configured to calculate a difference by subtracting the third pressure value P3 from the first pressure value P1. This difference is a thrust force F acting on the piston 102. The differential amplifier circuit 205 is one example of the calculator in the present disclosure.

During forward movement of the piston 102, the force acting on the first piston end face 102a of the piston 102 is larger than the force acting on the second piston end face 102b. During backward movement of the piston 102, the force acting on the second piston end face 102b is larger than the the force acting on the first piston end face 102a. This relationship between the acting forces does not change with the speed of an operating takt.

The thrust force F corresponding to a difference obtained by subtracting the third pressure value P3 from the first pressure value P1 is always a positive value when the piston is in forward movement and is always a negative value when the piston is in backward movement.

The differential amplifier circuit 205 is connected to the microcomputer 201 and the calculated thrust force F by the differential amplifier circuit 205 to act on the piston 102 is input to the microcomputer 201. The microcomputer 201 thus monitors the operation of the piston 102 based on the thrust force F. The microcomputer 201 is one example of a monitor in the present disclosure.

To be concrete, the microcomputer 201 is configured to determine whether the piston 102 is moving forward or moving backward based on the sign (positive or negative) of the thrust force F input from the differential amplifier circuit 205 to the microcomputer 201. Specifically, based on whether the thrust force F is positive or negative in sign, the microcomputer 201 determines whether the piston 102 is moving forward or moving backward and thus can accurately monitor the operation of the piston 102 irrespective of the speed of an operating takt.

Furthermore, the microcomputer 201 can determine whether the piston 102 has started moving or stopped moving based on the change rate of the thrust force F transmitted from the differential amplifier circuit 205.

The microcomputer 201 is configured to perform time differentiation of the thrust force F transmitted from the differential amplifier circuit 205 and calculate a differential value dF corresponding to the change rate of the thrust force F The microcomputer 201 is configured to monitor whether or not the differential value dF has sharply varied in a positive direction or in a negative direction with time. If the microcomputer 201 captures a sharp change of the differential value dF, the microcomputer 201 determines that the movement of the piston 102 has started or stopped. Since the microcomputer 201 makes a determination on the operation of the piston 102 based on the differential value dF of the thrust force F, the microcomputer 201 does not need to perform such a parallel information processing as in a conventional art for both the differential value of the first pressure value in the first pressure acting chamber and the differential value of the second pressure value in the second pressure acting chamber. This configuration can prevent the risk that the information processing of the microcomputer 201 may delay.

The microcomputer 201 is connected to the display unit 206, the communication unit 208, and the signal output circuit 209. The information obtained by determination processing by the microcomputer 201 can be displayed on the display unit 206 and output to the exterior through the communication unit 208 and the signal output circuit 209.

Since the information obtained by determination processing by the microcomputer 201 is displayed on the display unit 206 or output to the exterior, a user can grasp the accurate operating situation of the actuator 10 and hence easily set a desired operating takt while adjusting the pressure of a fluid to be supplied and the speed controllers 14.

The microcomputer 201 is also connected to the setting unit 207 which enables a user to enter and set any information needed for determination processing in the microcomputer 201, such as a piston diameter. As an alternative, the information needed for the microcomputer 201 to perform determination processing on the movement of the piston 102 may be input externally.

Next, behaviors of the first pressure value P1 and the third pressure value P3 with time will be described below, referring to FIGS. 3A to 3C. FIG. 3A is a graph showing behaviors of the first pressure value P1 and the third pressure value P3 appearing when, for 1 sec of a switching cycle of the changeover valve 13, the speed controllers 14 are adjusted to control the exhaust amount of air so that the operating takt of the piston 102 is 900 msec.

At time t0 in FIG. 3A, an electric signal is applied to the solenoid 134A. When the solenoid 134A receives the electric signal, the valve element of the changeover valve 13 is attracted toward the solenoid 134A, allowing the inlet port 133 to communicate with the first connection port 131 and the second connection port 132 to communicate with the outside (at time t1 in FIG. 3A).

When the inlet port 133 communicates with the first connection port 131, the compressed air supplied from the compressed air supply source 16 is allowed to flow into the changeover valve 13 through the inlet port 133 and flow out of the changeover valve 13 through the first connection port 131. The compressed air discharged from the first connection port 131 flows through the first pipe 11 and enters the first pressure acting chamber 103.

On the other hand, the second pressure acting chamber 104 is allowed to communicate with the atmosphere via the second pipe 12 and the changeover valve 13 and starts to exhaust the compressed air (at time t1 in FIG. 3A).

As air is supplied to the first pressure acting chamber 103, the first pressure value P1 in the first pipe 11 connected to the first pressure acting chamber 103 sharply rises. In contrast, when air exhaust from the second pressure acting chamber 104 is started, the second pressure value P2 in the second pipe 12 connected to the second pressure acting chamber 104 decreases and the third pressure value P3 also decreases.

At time t2 in FIG. 3A, the first pressure value P1 and the third pressure value P3 become reverse to each other in magnitude and then, at time t3, the piston 102 starts to perform forward movement.

After start of the forward movement of the piston 102, the first pressure value P1 and the third pressure value P3 slowly increase until time t4 at which the piston 102 reaches the second cylinder end face 101b of the double-acting cylinder 101.

Upon reaching the second cylinder end face 101b of the double-acting cylinder 101, the piston 102 stops moving. When the piston 102 stops, the first pressure value P1 gently increases while the second pressure value P2 rapidly decreases.

Subsequently, at time t5 in FIG. 3A, an electric signal is applied to the solenoid 134B. When the solenoid 134B receives the electric current, the valve element of the changeover valve 13 is attracted toward the solenoid 134B, allowing the inlet port 133 to communicate with the second connection port 132 and the first connection port 131 to communicate with the outside (at time t6 in FIG. 3A).

When the inlet port 133 communicates with the second connection port 132, the compressed air supplied from the compressed air supply source 16 is allowed to flow into the changeover valve 13 through the inlet port 133 and flow out of the changeover valve 13 through the second connection port 132. The compressed air discharged from the second connection port 132 flows through the second pipe 12 and enters the second pressure acting chamber 104.

On the other hand, the first pressure acting chamber 103 is allowed to communicate with the atmosphere via the first pipe 11 and the changeover valve 13 and starts to exhaust the compressed air.

As air is supplied to the second pressure acting chamber 104, the second pressure value P2 in the second pipe 12 connected to the second pressure acting chamber 104 sharply rises, and thus the third pressure value P3 also sharply rises. In contrast, air exhaust from the first pressure acting chamber 103 is started, the first pressure value P1 in the first pipe 11 connected to the first pressure acting chamber 103 decreases.

At time t7 in FIG. 3A, the first pressure value P1 and the third pressure value P3 become reverse to each other in magnitude and then, at time t8, the piston 102 starts to perform backward movement.

When the piston 102 starts moving backward, the first pressure value P1 and the third pressure value P3 slowly increase until time t9 at which the piston 102 reaches an end face 101a of the double-acting cylinder 101, the end face 101a being located facing the first pressure acting chamber 103 (referred to as a first cylinder end face 101a).

Upon reaching the first cylinder end face 101a of the double-acting cylinder 101, the piston 102 stops moving. When the piston 102 stops, the third pressure value P3 slowly increases while the first pressure value P1 rapidly decreases.

At time t10 in FIG. 3A, an electric signal is applied to the solenoid 134A and subsequent behaviors are the same as those from t0 to t10 in FIG. 3A.

FIG. 3B is a graph plotting the thrust force F acting on the piston 102 obtained from the foregoing behaviors with time of the first pressure value P1 and the third pressure value P3. Concretely, the thrust force F is calculated by subtracting the third pressure value P3 from the first pressure value P1, the third pressure value P3 being a value obtained by multiplying the second pressure value P2 by a pressure-receiving area ratio. The pressure-receiving area ratio indicates a ratio of the pressure-receiving area of the second piston end face 102b of the piston 102 to the pressure-receiving area of the first piston end face 102a. This pressure-receiving area ratio is used in consideration that the pressure-receiving area of the second piston end face 102b attached with the rod 105 is smaller than the first piston end face 102a of the piston 102. For example, assuming that the piston diameter is 25 mm and the rod diameter is 12 mm, the pressure-receiving area ratio is about 0.75.

The details of the behaviors with time of the thrust force F will be described below. At time t0 at which the electric signal is applied to the solenoid 134A of the changeover valve 13, the thrust force F is a negative value because the piston 102 has performed backward movement until just before. By switching of the changeover valve 13 at time t1, air supply to the first pressure acting chamber 103 and air exhaust from the second pressure acting chamber 104 are started and thus the thrust force F acting on the piston 102 sharply rises in a positive direction, i.e., toward a positive side. The thrust force F exceeds 0 at time t2 and then, at time t3, the piston 102 starts the forward movement. After start of the forward movement of the piston 102, the thrust force F slowly decreases until time t4 at which the forward movement of the piston 102 is completed. After completion of the forward movement of the piston 102, an electric signal is applied to the solenoid 134B (time t5) and the thrust force F increases until time t6 at which the changeover valve 13 is switched over.

Upon switching of the changeover valve 13, air supply to the second pressure acting chamber 104 is started and also air exhaust from the first pressure acting chamber 103 is started. Thus, the thrust force F acting on the piston 102 sharply changes in a negative direction. At time t7, the thrust force F becomes 0. At time t8, the piston 102 starts to perform backward movement. Thereafter, until t9 at which the backward movement of the piston 102 is completed, the thrust force F slowly declines. Upon completion of the backward movement of the piston 102, the thrust force F sharply declines.

The thrust force F during the forward movement of the piston 102 is a positive value. In contrast, the thrust force F during the backward movement of the piston 102 is a negative value. Thus, the microcomputer 201 can determine whether the piston 102 is moving forward or is moving backward based on whether the thrust force F is positive or negative in sign. The microcomputer 201 can accurately monitor the operation of the piston 102 irrespective of the speed of the operating takt.

FIG. 3C is a graph plotting the behaviors with time of the time differential value dF obtained from the thrust force F.

The details of the behavior with time of the differential value dF will be described below.

In a time period from the switching of the changeover valve 13 (t0) to the start of the forward movement of the piston 102 (t3), the differential value dF steeply changes in a positive direction, i.e., from a negative side toward a positive side, in association with a sharp rise of the thrust force F. This differential value dF remains substantially 0 from the start of forward movement of the piston 102 until just before time t4 at which the piston 102 completes, or stops, the forward movement, and then the differential value dF steeply drops in a negative direction.

Thereafter, the differential value dF slowly increases toward nearly 0 until t5 at which an electric signal is applied to the solenoid 134B and, at time t5, the differential value dF steeply changes in the positive direction. Subsequently, the differential value dF decreases toward nearly 0 until time t8 at which the piston 102 starts to perform backward movement. From the start of backward movement of the piston 102 to just before time t9 at which the backward movement is completed, the differential value dF is kept at nearly 0. Upon completion of the backward movement, the differential value dF steeply changes in the positive direction and then slowly declines toward nearly 0 until time t10 at which the changeover valve 13 is switched.

The microcomputer 201 calculates the time differential value dF with respect to the thrust force F sequentially transmitted from the differential amplifier circuit 205. By capturing a sharp change of the differential value dF in the positive direction or the negative direction, the microcomputer 201 determines whether the piston 102 starts moving or stops moving. The microcomputer 201 does not need to perform such a parallel information processing as in a conventional art for both the differential value of the first pressure value in the first pressure acting chamber and the differential value of the second pressure in the second pressure acting chamber. Thus, the microcomputer 201 has no risk of causing a delay in the information processing.

Figure 4:
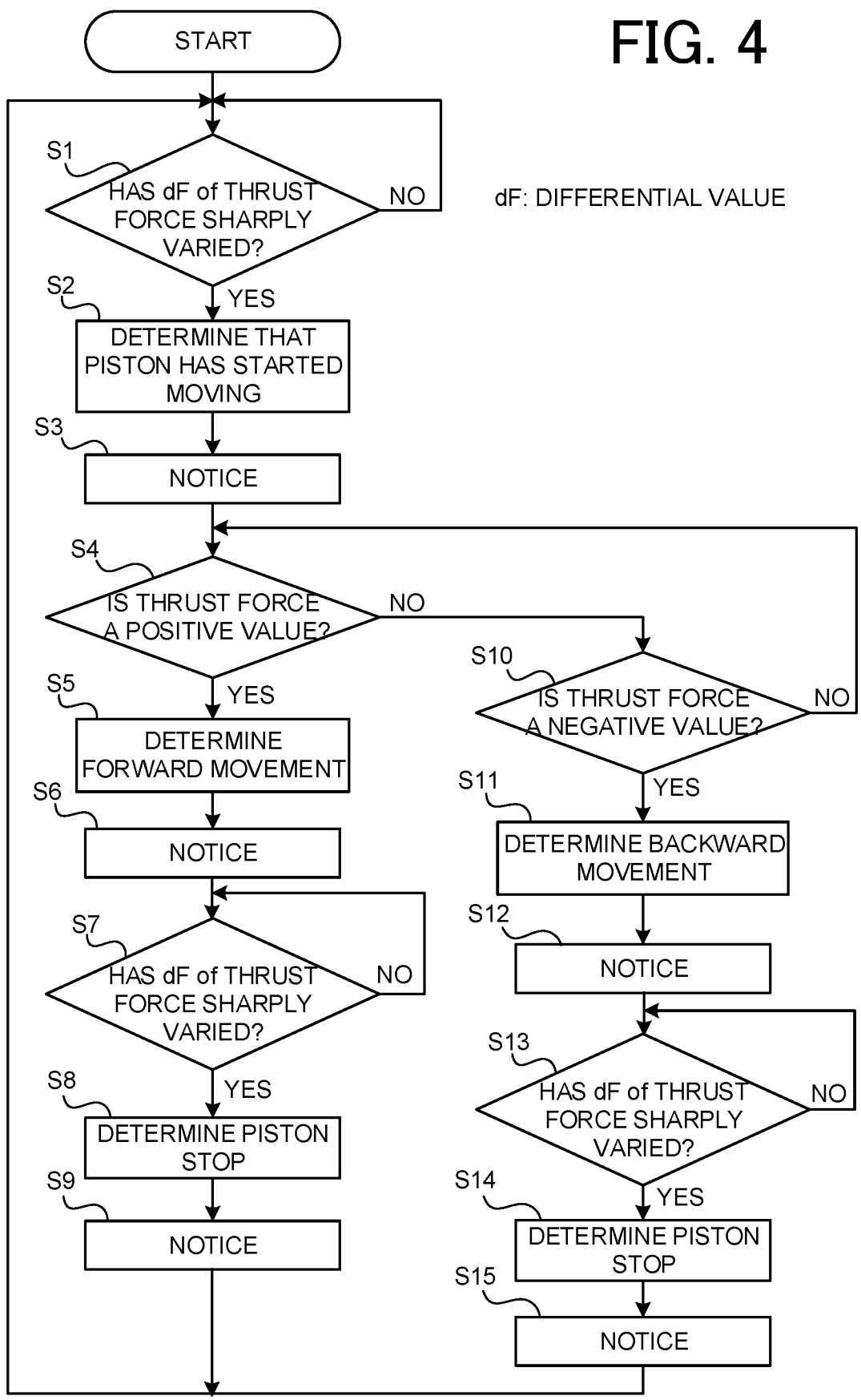
FIG. 4 is a flowchart of a program to be performed by a microcomputer to determine operations of a piston.
Figure 5:
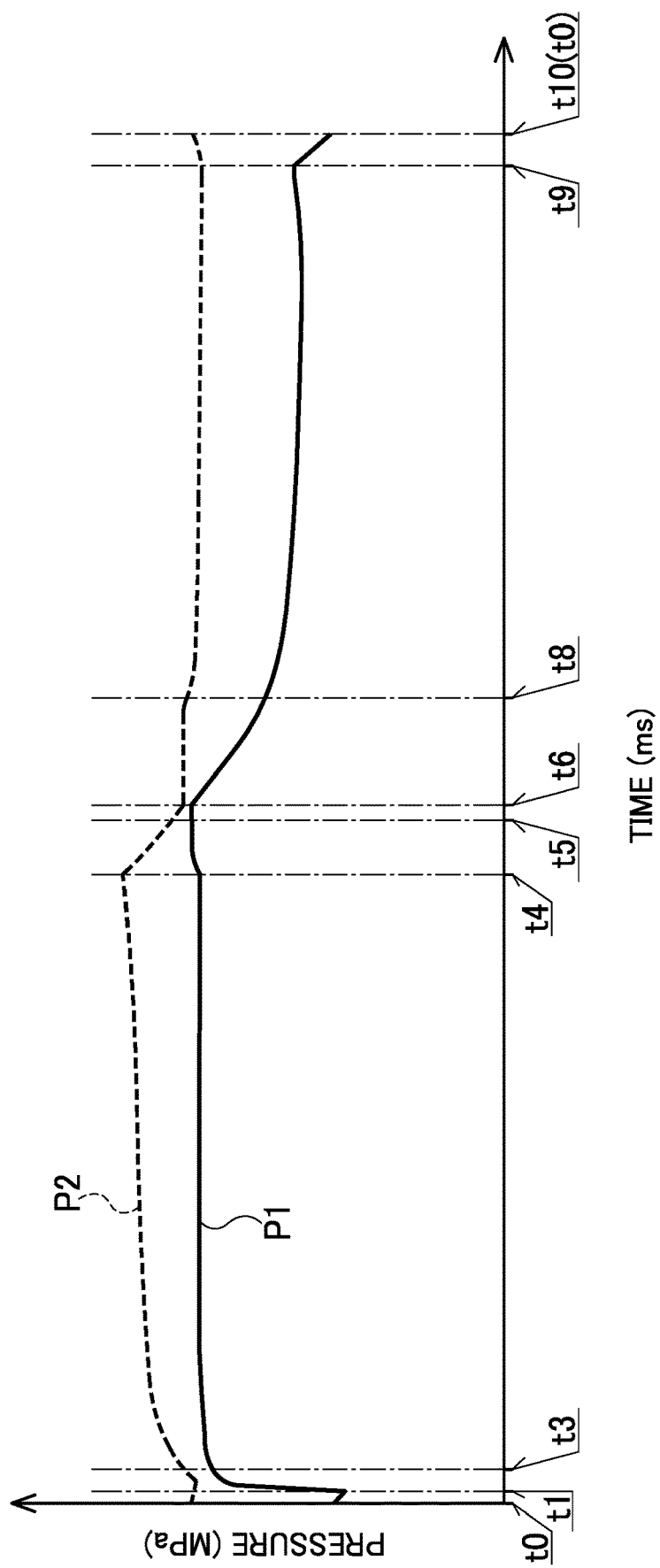
FIG. 5 is a graph showing behaviors of a first pressure value and a second pressure value varying with time in a related art.
Figure 6:
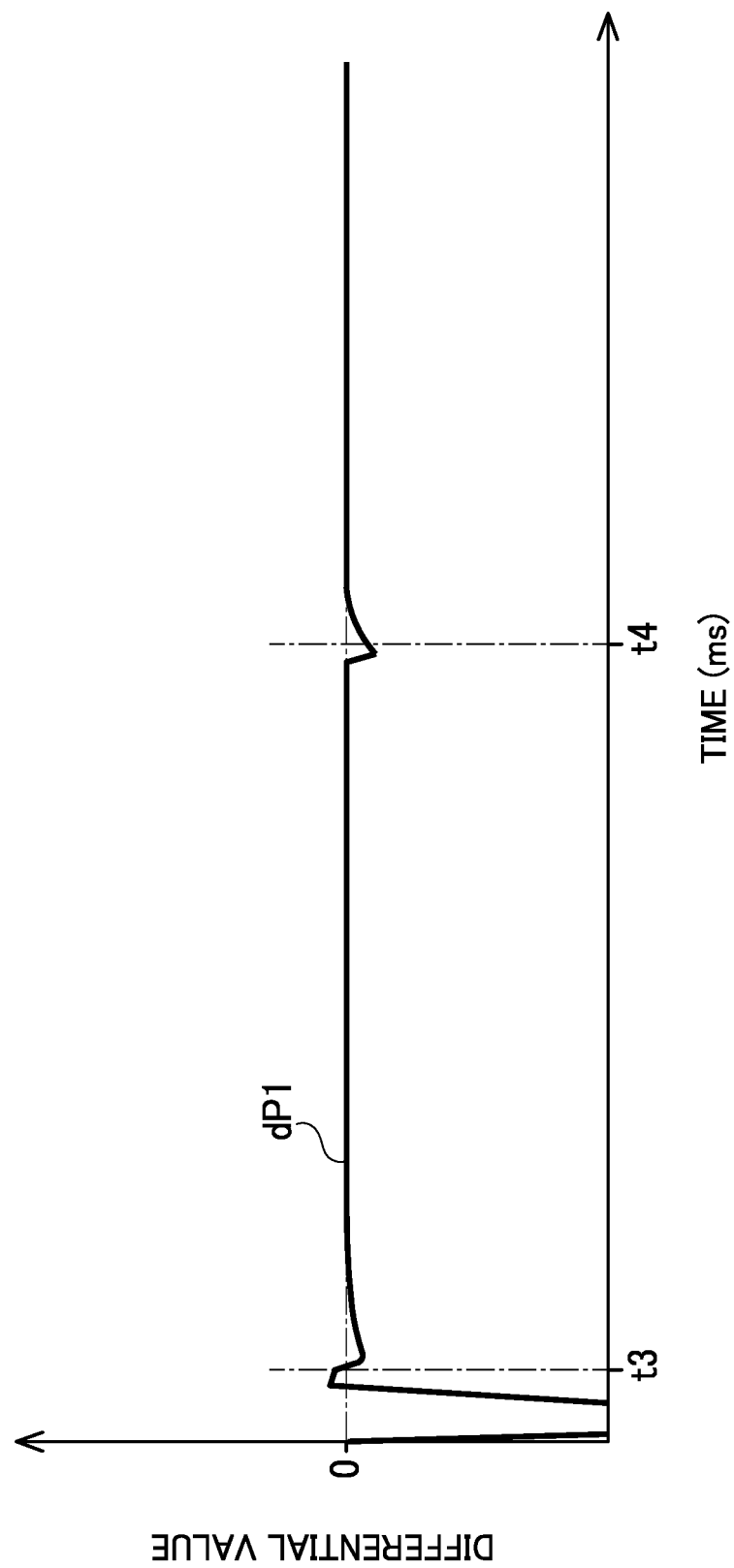
FIG. 6 is a graph showing behaviors of a time differential value of a first pressure value varying with time in a related art.
Figure 7:
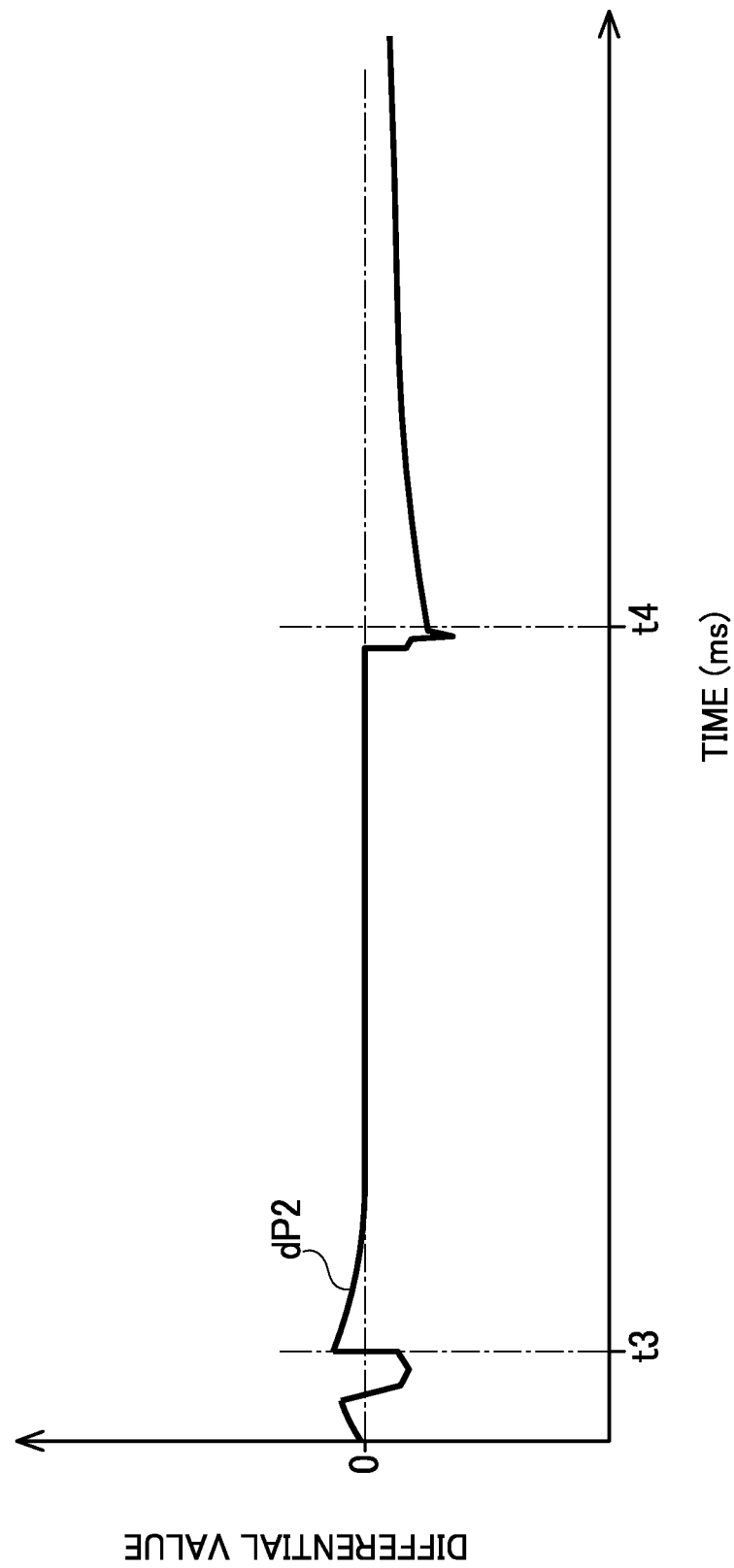
FIG. 7 is a graph showing behaviors of a time differential value of a second pressure value varying with time in the related art.

FIG. 4 is a flowchart to determine the operation of the piston 102 based on the signs of the thrust force F and the time differential value dF.

The microcomputer 201 calculates the time differential value dF based on the sequentially transmitted thrust force F and determines whether or not the calculated time differential value dF has sharply varied (S1). If the time differential value dF has sharply varied (S1: YES), the microcomputer 201 determines that the piston 102 has started moving from one end to the other end of the double-acting cylinder 101 (S2) and displays this determination result on the display unit 206 to give notice to a user (S3).

Thereafter, the microcomputer 201 determines whether or not the thrust force F is a positive value (S4). If the thrust force F is a positive value (S4: YES), the microcomputer 201 determines that the piston 102 is moving forward (S5) and displays this determination result on the display unit 206 to give notice to a user (S6).

Subsequently, the microcomputer 201 determines whether or not the time differential value dF has sharply varied (S7). If the time differential value dF has sharply varied (S7: YES), the microcomputer 201 determines that the piston 102 has reached one end of the double-acting cylinder 101 and stopped moving (S8). The microcomputer 201 displays this determination result on the display unit 206 to give notice to a user (S9).

In contrast, if the microcomputer 201 determines in S4 that the thrust force F is not a positive value (S4: NO), the microcomputer 201 determines whether or not the thrust force F is a negative value (S10). If the thrust force F is a negative value (S10: YES), the microcomputer 201 determines that the piston 102 is moving backward (S11) and displays this determination result on the display unit 206 to give notice to a user (S12).

Then, the microcomputer 201 judges if the time differential value dF has sharply varied (S13). If the time differential value dF has sharply varied (S13: YES), the microcomputer 201 determines that the piston 102 has reached one end of the double-acting cylinder 101 and stopped moving (S14). The microcomputer 201 displays this determination result on the display unit 206 to give notice to a user (S15).

The thrust force F during forward movement of the piston 102 is a positive value and the thrust force F during backward movement of the piston 102 is a negative value. Based on whether the thrust force F is a positive value or a negative value, therefore, the microcomputer 201 can determine whether the piston 102 is moving forward or backward. The microcomputer 201 can thus accurately monitor the operation of the piston 102 irrespective of the speed of the operating takt.

The microcomputer 201 calculates the time differential value dF with respect to the thrust force F sequentially transmitted from the differential amplifier circuit 205. By capturing a sharp change of the differential value dF in the positive or negative direction, the microcomputer 201 determines whether the piston 102 starts moving or stops moving. The microcomputer 201 does not need to perform such a parallel information processing as in a conventional art for both the differential value of the first pressure value in the first pressure acting chamber and the differential value of the second pressure value in the second pressure acting chamber. Thus, the microcomputer 201 has no risk of causing a delay in the information processing.

(1) As described above, the actuator-operation detecting apparatus 20 in the present embodiment configured as below. In the actuator-operation detecting apparatus 20 for the actuator 10 including the double-acting cylinder 101, the piston 102 slidably supported in the cylinder 101 to partition the inside thereof into the first pressure acting chamber 103 and the second pressure acting chamber 104, and the rod 105 coupled to the second piston end face 102*b* of the piston 102, the actuator-operation detecting apparatus 20 being configured to monitor the operating state of the piston 102 in the actuator 10, the operation detecting apparatus 20 includes the first pressure detector 202 configured to detect the pressure in the first pressure acting chamber 103, the second pressure detector 203 configured to detect the pressure in the second pressure acting chamber 104, the differential amplifier circuit 205 configured to calculate the thrust force F acting on the piston 102 based on the pressure (the first pressure value P1) detected by the first pressure detector 202, the pressure (the second pressure value P2) detected by the second pressure detector 203, and the pressure-receiving area of the piston 102, and the microcomputer 201 configured to check the operating state of the piston 102 based on the thrust force F. Accordingly, the first pressure detector 202 and the second pressure detector 203 respectively detect the pressure in the first pressure acting chamber 103 and the pressure in the second pressure acting chamber 104. Based on the pressure in the first pressure acting chamber 103, the pressure in the second pressure acting chamber 104, and the pressure-receiving area of the piston 102, the differential amplifier circuit 205 calculates the thrust force F acting on the piston 102. Based on the calculated thrust force F, the microcomputer 201 can check the operating state of the piston 102. During forward movement of the piston 102, the force acting on the first piston end face 102*a* of the piston 102 is larger than the force acting on the second piston end face 102*b*. To the contrary, during backward movement of the piston 102, the force acting on the second piston end face 102*b* is larger than the force acting on the first piston end face 102*a*. This relationship between the acting forces does not change with the speed of an operating takt. Thus, the thrust force F acting on the piston 102 has only to be calculated to determine whether the piston 102 is in forward movement or in backward movement. The operation detecting apparatus 20 can accurately monitor the operation of the piston 102 irrespective of the speed of an operating takt.

(2) In the actuator-operation detecting apparatus 20 described in (1), the differential amplifier circuit 205 is configured to calculate the thrust force F by considering that the pressure-receiving area of the second piston end face 102*b* of the piston 102 is smaller than the pressure-receiving area of the first piston end face 102*a* of the piston 102 by the outer diameter of the rod 105. The microcomputer 201 is configured to check the operating state of the piston 102 based on the sign of the thrust force F. Because of the rod 105 coupled to the second piston end face 102*b* of the piston 102, the the pressure-receiving area of the second piston end face 102*b* of the piston 102 is smaller than the pressure-receiving area of the first piston end face 102*a* of the piston 102 by the outer diameter of the rod 105. Thus, the above calculation of the thrust force F is made in consideration of such a relationship in pressure-receiving area.

Herein, the thrust force F indicates a value obtained by a subtracting a result value (the third pressure value P3) of multiplying of the second pressure value P2 of the second pressure acting chamber 104 by the pressure-receiving area ratio from the first pressure value P1 of the first pressure acting chamber 103.

The pressure-receiving area ratio is a ratio of the pressure-receiving area of the second piston end face 102*b* of the piston 102 to the pressure-receiving area of the first piston end face 102*a*. For example, assuming that the diameter of the piston 102 is 25 mm and the diameter of the rod 105 is 12 mm, the ratio of the pressure-receiving area of the second piston end face 102*b* of the piston 102 to the pressure-receiving area of the first piston end face 102*a* is about 0.75. In other words, when the value (the third pressure value P3) obtained by multiplying the second pressure value P2 by 0.75 is subtracted from the first pressure value P1, the result value is the thrust force F acting on the piston 102.

In the case of monitoring the reciprocation of the piston 102 based on the pressures, when the piston 102 is to be moved forward while the air exhaust amount is controlled by the speed controllers 14, even when the second pressure value of the second pressure acting chamber 104 is higher than the first pressure value of the first pressure acting chamber 103, the force acting on the second piston end face 102*b* of the piston 102 is lower than the force acting on the first piston end face 102*a* because the pressure-receiving area of the second piston end face 102*b* of the piston 102 is smaller than that of the first piston end face 102*a* by the area of the rod 105 connected to the second piston end face 102*b*, so that the piston 102 can be moved forward. In some cases, consequently, the reciprocation of the piston 102 cannot be accurately monitored based on the magnitude relationship between the first pressure value and the second pressure value. In contrast, when the thrust force F acting on the piston 102 is obtained in consideration of the pressure-receiving area of the piston 102, the thrust force F is always obtained as a positive value during forward movement of the piston 102 and the thrust force F is always obtained as a negative value during backward movement of the piston 102.

The microcomputer 201 can check the operating state of the piston 102 based on the sign of the thrust force F obtained as above. Based on whether the thrust force F is a positive value or a negative value, the microcomputer 201 can determine whether the piston 102 is moving forward or moving backward. Based on this determination that the 102 is moving forward or backward, microcomputer 201 can accurately monitor the operation of the piston 102.

(3) In the actuator-operation detecting apparatus 20 described in (1) or (2), the microcomputer 201 is configured to check the operating state of the piston 102 based on the change rate of the thrust force F. Thus, the microcomputer 201 has only to perform information processing based on only the change rate of the thrust force F and does not need to perform such a parallel information processing as in a conventional art based on both the change rate of the first pressure value of the first pressure acting chamber 103 and the change rate of the second pressure value of the second pressure acting chamber 104. Accordingly, the microcomputer 201 built in the actuator-operation detecting apparatus 20 can prevent a delay in the information processing.

(4) In the actuator-operation detecting apparatus 20 described in one of (1) to (3), the microcomputer 201 is configured to determine whether the piston 102 has started moving or stopped moving and, if the piston 102 is determined to have started moving, also to determine whether the piston 102 is moving toward the first cylinder end face 101a of the double-acting cylinder 101 (backward movement) or toward the second cylinder end face 101b of the double-acting cylinder 101 (forward movement). The actuator-operation detecting apparatus 20 includes the display unit 206 to display thereon the information determined by the microcomputer 201. Thus, a user can accurately grasp the accurate operating state of the actuator 10 and hence easily set a desired operating takt while adjusting the pressure of a fluid to be supplied, the speed controllers 14, and others.

The foregoing embodiments are mere examples and give no limitation to the present disclosure. The present disclosure may be embodied in other specific forms without departing from the essential characteristics thereof.

For instance, the foregoing embodiment exemplifies that the speed controllers 14 are configured to limit the amount of air to be exhausted. As an alternative, the speed controllers may be configured to limit the amount of air to be supplied. In this case, the same effects as in the foregoing embodiment can also be achieved.

REFERENCE SIGNS LIST

10 Actuator
20 Actuator-operation detecting apparatus
101 Double-acting cylinder
102 Piston
103 First pressure acting chamber
104 Second pressure acting chamber
105 Rod
201 Microcomputer
202 First pressure detector
203 Second pressure detector
204 Voltage divider
205 Differential amplifier circuit

What is claimed is:

1. An actuator-operation detecting apparatus for an actuator, the actuator including: a double-acting cylinder; a piston slidably supported in the double-acting cylinder to partition an inside of the double-acting cylinder into a first pressure acting chamber and a second pressure acting chamber; and a rod coupled to an end face of the piston that faces the second pressure acting chamber, the actuator-operation detecting apparatus being configured to monitor an operating state of the piston, wherein the actuator-operation detecting apparatus comprises:

a first pressure detector configured to detect pressure in the first pressure acting chamber;

a second pressure detector configured to detect pressure in the second pressure acting chamber;

a calculator configured to calculate a thrust force acting on the piston by considering that a first pressure-receiving area of the end face of the piston that faces the second pressure acting chamber is smaller by an outer diameter of the rod than a second pressure-receiving area of an end face of the piston that faces the first pressure acting chamber and subtracting a value obtained by multiplying a pressure value detected by the second pressure detector by a ratio of the first pressure-receiving area to the second pressure-receiving area from a pressure value detected by the first pressure detector; and a monitor configured to check the operating state of the piston based on a sign of the thrust force.

2. The actuator-operation detecting apparatus according to claim 1, wherein the monitor is configured to check the operating state of the piston based on a change rate of the thrust force.

3. The actuator-operation detecting apparatus according to claim 2, wherein the monitor is configured to:
determine whether the piston has started moving or has stopped moving; and if the piston is determined to have started moving,
determine whether the piston is moving toward an end face of the double-acting cylinder that faces the first pressure acting chamber or the piston is moving toward an end face of the double-acting cylinder that faces the second pressure acting chamber.

4. The actuator-operation detecting apparatus according to claim 1, wherein the monitor is configured to:
determine whether the piston has started moving or has stopped moving; and if the piston is determined to have started moving,
determine whether the piston is moving toward an end face of the double-acting cylinder that faces the first pressure acting chamber or the piston is moving toward an end face of the double-acting cylinder that faces the second pressure acting chamber.

5. The actuator-operation detecting apparatus according to claim 1, wherein the monitor checks the operating state of the piston by determining whether the piston is moving toward an end face of the double-acting cylinder that faces the first pressure acting chamber or the piston is moving toward an end face of the double-acting cylinder that faces the second pressure acting chamber.

* * * * *